May 20, 1941.  T. E. BROWN  2,242,990
INTERNAL COMBUSTION ENGINE
Filed Feb. 15, 1941
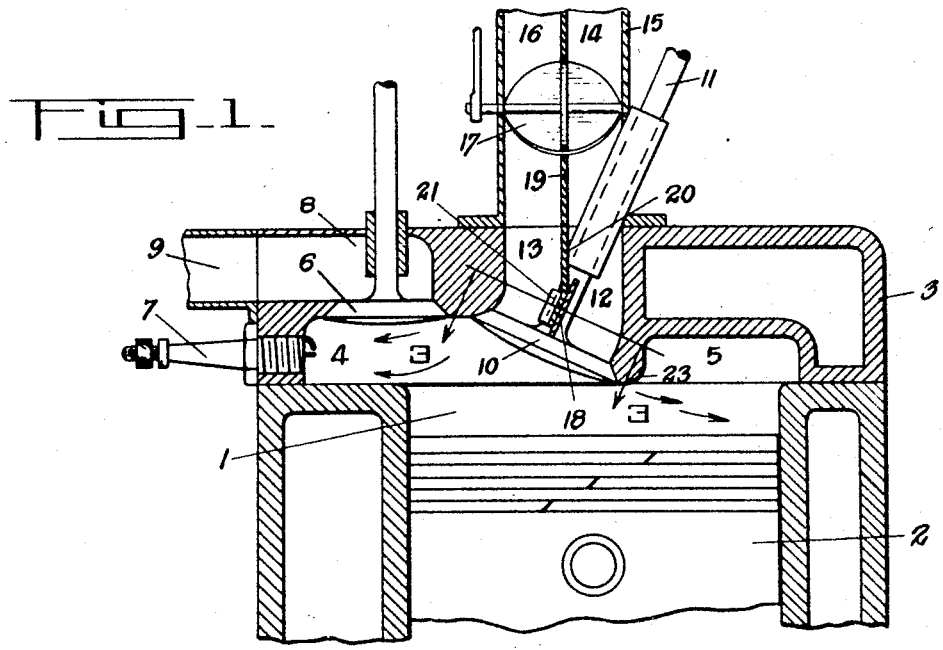
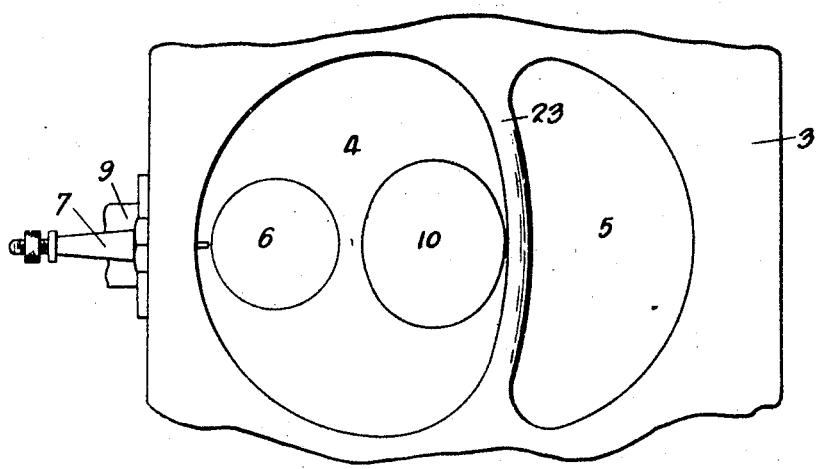
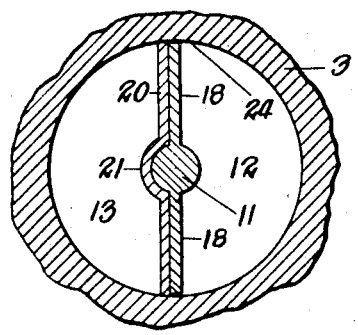
Inventor
Thomas E. Brown
By
Atty Patented May 20, 1941

2,242,990

UNITED STATES PATENT OFFICE 2,242,990

INTERNAL COMBUSTION ENGINE

Thomas Edgar Brown, Hamilton, Ontario, Canada

Application February 15, 1941, Serial No. 379,006

9 Claims. (Cl. 123—75)

My invention relates to improvements in combustion chambers for internal combustion engines and is a modification of the combustion chamber disclosed in my United States Patent No. 2,179,143, Internal combustion engine, issued November 7, 1939.

In my United States Patent No. 2,179,143, I disclosed an engine head formed with primary and secondary combustion chambers. The head was provided with two inlet valves, one inlet valve controlling the entry of a rich gasoline and air mixture into the primary combustion chamber and the secondary inlet valve controlling the admission of air into the secondary combustion chamber. The primary combustion chamber also contained the usual exhaust valve and spark plug.

The object of my present invention is to provide a cylinder head also formed with primary and secondary combustion chambers, but to replace the pair of inlet valves by a single inlet valve, such single inlet valve being positioned to open into the side of the primary combustion chamber adjacent to the secondary combustion chamber, and formed with a partition whereby a stream of rich gasoline and air mixture is directed past one side of the partition and the open valve into the primary combustion chamber and a stream of unadulterated air past the other side of the partition and the open valve to travel across the baffle in the cylinder head into the secondary combustion chamber.

A further object of my invention is to position my inlet valve at an inclination so that it slopes from the lower edge of the baffle to the upper wall of the primary combustion chamber, such inclination of the valve directing the gasoline mixture and air flows respectively in the desired directions.

With the foregoing and other objects in view as shall further appear, my invention consists of an internal combustion head constructed and arranged all as hereinafter more particularly described and illustrated in the accompanying drawing, in which:

Figure 1 is a vertical cross-sectional view through an internal combustion engine cylinder head incorporating my invention.

Figure 2 is an inverted plan view of my cylinder head, and,

Figure 3 is an enlarged cross-sectional view through the inlet passages in the head and taken through the line 3—3, Figure 1.

Like characters of reference indicate corresponding parts in the different views of the drawing.

1 is the engine cylinder and 2 the piston reciprocable therein. The head 3 is secured to the cylinder 1 in the usual fashion and is formed with a primary combustion chamber 4 and a secondary combustion chamber 5. The primary combustion chamber 4 contains a suitably actuated exhaust valve 6 and a spark plug 7. The exhaust passage 8 in the head is connected to an exhaust manifold 9.

An inlet poppet valve 10 is positioned to extend at an inclination from the lower edge of the baffle 23 and open into the portion of the primary combustion chamber 4 adjacent to the secondary combustion chamber 5. The valve 10 is formed with the usual valve stem 11 projecting outwardly from the head and actuated in the usual manner. A pair of chambers 12 and 13 are positioned above the head of the valve 10 and communicate with the cylinder when the valve is opened. The chamber 12 communicates with an unadulterated air intake passage 14 in the intake manifold 15 and the chamber 13 communicates with a gasoline and air intake passage 16 in the manifold 15. Both passages 14 and 16 are controlled by a unitary throttle valve 17, as described in detail in my United States Patent No. 2,179,143.

The valve stem 11 is formed with a pair of diametrically positioned wings 18 which project from the sides of the stem to slidably engage the face 24 of the passage forming the chambers 12 and 13, as will be seen upon reference to Figure 3. The bottoms of the wings 18 abut or are integral with the upper face of the valve head 10. The intake manifold 15 and the passage in the head communicating therewith are divided into the passages 14 and 16 and the chambers 12 and 13 by a pair of aligned partitions 19 and 20 in the intake manifold and passage. The lower end of the partition 20 is set at an angle to follow the inclination of the valve stem 11 and formed with a central concave portion 21 extending around one side of the valve stem 11. The lower portion of the partition 20 slidably engages the wings 18 on the valve.

It will thus be seen that the valve 10 controls the passage of air through the passage 14 and chamber 12 into the cylinder head and the passage of gasoline and air mixture through the passage 16 and chamber 13 into the primary combustion chamber 4, and that the provision of the wings 18 on the valve in sliding contact with the lower end of the partition 20 prevents the gasoline mixture from passing across the face of the open valve 10 into the flow of unadulterated air in the chamber 12 or vice versa.

The operation of my invention is as follows:

As the piston 2 moves downwardly on the induction stroke, the valve 10 opens and a rich mixture of gasoline and air is inducted from the passage 16 through the chamber 13 and over the left-hand side of the valve 10 and into the primary combustion chamber 4, substantially in the direction as indicated by the arrows in the drawing. At the same time unadulterated air is inducted through the passage 14 and chamber 12 and over the right-hand side of the valve 10 and into the secondary combustion chamber 5 and that portion of the cylinder head opening into the secondary combustion chamber 5. As the piston 3 returns on its compression stroke, the valve 10 closes and the rich mixture which has been passing into the primary combustion chamber 4 is compressed in such chamber, and the unadulterated air which has been passing into the secondary combustion chamber 5 is compressed in such chamber. While there possibly may be somewhat of a small dilution of the respective streams of gasoline mixture and pure air passing into the opposite sides of the cylinder due to swirling, it will be quite apparent that even with a certain amount of mixing of the two streams, upon the approach of the piston to the instant of firing, the chamber 4 will contain a rich mixture of gasoline and air while the contents of the chamber 5 will be principally air with a very small proportion of gasoline vapour.

When the mixture in the chamber 4 is ignited as the piston commences its power stroke, the expanding ignited rich gasoline mixture in the chamber 4 will pass across the head of the cylinder as the piston 2 descends and will mix with and be burned with the air in the secondary chamber 5 so that a more even burning is obtained during the entire power stroke of the piston. By igniting that portion of the air and gasoline charge which is relatively rich and by then firing the entire charge by flame propagation after the rich primary charge is ignited, the efficiency and smooth running of an internal combustion engine is appreciably enhanced and the power output of the engine for a given gasoline charge considerably increased. This will be appreciated upon consideration of the invention where it is apparent that a leaner proportion of gasoline vapour to air can be employed when and if at the time of firing a rich gasoline mixture surrounds the point of ignition.

As the piston 2 returns upon its exhaust stroke, the exhaust valve 6 opens whereby the burnt gases pass out of the cylinder through the primary combustion chamber 4 and past the open valve 6 through the exhaust passage 8 into the manifold 9. As the piston returns upon its induction stroke the valve 10 opens and the exhaust valve 6 shuts.

From the foregoing description it will be apparent that I have devised a very simple and yet greatly improved cylinder head wherein an inlet valve and an exhaust valve are only incorporated, thus there is no departure from standard practice, but by the use of which a smaller proportion of gasoline vapour to air may be used without decreasing the power output of the engine, and also wherein a better flame propagation and more even burning is obtained. While I have illustrated a particular embodiment of my invention, it is to be understood that I may make such changes and alterations therein as I may at any time deem necessary without departing from the spirit of my invention as set forth in the appended claims.

What I claim as my invention is:

1. An internal combustion engine having a cylinder, a piston reciprocable therein, a cylinder head in which is formed a primary combustion chamber and a secondary combustion chamber, a dividing baffle separating the chambers and extending across the cylinder head, an intake valve positioned in the cylinder head, an air and fuel passage extending to the valve, an air passage also extending to the valve, said valve constituting an operable closure for both passages, the ends of the passages and the valve being so positioned in the cylinder head that upon the valve being opened the air and fuel mixture is directed towards the primary combustion chamber and the air towards the secondary combustion chamber, an exhaust valve in the primary combustion chamber, and a spark plug in the primary combustion chamber.

2. An internal combustion engine having a cylinder, a piston reciprocable therein, a cylinder head in which is formed a primary combustion chamber and a secondary combustion chamber, a dividing baffle separating the chambers and extending across the cylinder head and having its lower face positioned to just clear the piston top at the limit of the piston's upward stroke, an intake valve positioned in the cylinder head, an air and fuel passage extending to the valve, an air passage also extending to the valve, said valve constituting an operable closure for both passages, the ends of the passages and the valve being so positioned in the cylinder head that upon the valve being opened the air and fuel mixture is directed towards the primary combustion chamber and the air towards the secondary combustion chamber, an exhaust valve in the primary combustion chamber, and a spark plug in the primary combustion chamber.

3. An internal combustion engine having a cylinder, a piston reciprocable therein, a cylinder head in which is formed a primary combustion chamber and a secondary combustion chamber, a dividing baffle separating the chambers and extending across the cylinder head, an intake valve positioned in the primary combustion chamber, an air and fuel passage extending to the valve, an air passage also extending to the valve, said valve constituting an operable closure for both passages, the ends of the passages and the valve being so positioned in the cylinder head that upon the valve being opened the air and fuel mixture is directed towards the primary combustion chamber and the air towards the secondary combustion chamber, an exhaust valve in the primary combustion chamber, and a spark plug in the primary combustion chamber.

4. An internal combustion engine having a cylinder, a piston reciprocable therein, a cylinder head in which is formed a primary combustion chamber and a secondary combustion chamber, a dividing baffle separating the chambers and extending across the cylinder head and having its lower face positioned to just clear the piston top at the limit of the piston's upward stroke, an intake valve positioned in the primary combustion chamber, an air and fuel passage extending to the valve, an air passage also extending to the valve, said valve constituting an operable closure for both passages, the ends of the passages and the valve being so positioned in the cylinder head that upon the valve being opened the air and fuel mixture is directed towards the primary combustion chamber and the air towards the secondary combustion chamber, an exhaust valve in the primary combustion chamber, and a spark plug in the primary combustion chamber.

5. An internal combustion engine having a cylinder, a piston reciprocable therein, a cylinder head in which is formed a primary combustion chamber and a secondary combustion chamber, a dividing baffle separating the chambers and extending across the cylinder head, an intake poppet valve positioned in the primary combustion chamber and having its face inclining from the vicinity of the lower face of the baffle to the top face of the primary chamber, an air and fuel passage extending to the valve, an air passage also extending to the valve, said valve constituting an operable closure for both passages, the ends of the passages and the valve being so positioned in the cylinder head that upon the valve being opened the air and fuel mixture enters the primary combustion chamber and the air is directed towards the secondary combustion chamber, an exhaust valve in the primary combustion chamber, and a spark plug in the primary combustion chamber.

6. An internal combustion engine having a cylinder, a piston reciprocable therein, a cylinder head in which is formed a primary combustion chamber and a secondary combustion chamber, a dividing baffle separating the chambers and extending across the cylinder head, an intake poppet valve positioned in the primary combustion chamber and having its face inclining from the vicinity of the lower face of the baffle to the top face of the primary chamber, an air and fuel passage extending to the valve, an air passage also extending to the valve, said valve constituting an operable closure for both passages, a partition positioned between the passages in the vicinity of the valve, a pair of diametrically positioned wing-like members extending from the valve stem and having their lower edges adjacent the valve head, said wing-like members being in slidable relationship to the partition whereby a closure is effected between the passages irrespective of the position of the valve, the ends of the passages and the valve being so positioned in the cylinder head that upon the valve being opened the air and fuel mixture enters the primary combustion chamber and the air is directed towards the secondary combustion chamber, an exhaust valve in the primary combustion chamber, and a spark plug in the primary combustion chamber.

7. An internal combustion engine having a cylinder, a piston reciprocable therein, a cylinder head in which is formed a primary combustion chamber and a secondary combustion chamber, a dividing baffle separating the chambers and extending across the cylinder head, an intake valve positioned in the cylinder head, an air and fuel passage extending to the valve, an air passage also extending to the valve, said valve constituting an operable closure for both passages, a partition positioned between the passages in the vicinity of the valve, a pair of diametrically positioned wing-like members extending from the valve stem and having their lower edges adjacent the valve head, said wing-like members being in slidable relationship to the partition whereby a closure is effected between the passages irrespective of the position of the valve, the ends of the passages and the valve being so positioned in the cylinder head that upon the valve being opened the air and fuel mixture is directed towards the primary combustion chamber and the air towards the secondary combustion chamber, an exhaust valve in the primary combustion chamber, and a spark plug in the primary combustion chamber.

8. An internal combustion engine having a cylinder, a piston reciprocable therein, a cylinder head in which is formed a primary combustion chamber and a secondary combustion chamber, a dividing baffle separating the chambers and extending across the cylinder head and having its lower face positioned to just clear the piston top at the limit of the piston's upward stroke, an intake valve positioned in the primary combustion chamber, an air and fuel passage extending to the valve, an air passage also extending to the valve, said valve constituting an operable closure for both passages, a partition positioned between the passages in the vicinity of the valve, a pair of diametrically positioned wing-like members extending from the valve stem and having their lower edges adjacent the valve head, said wing-like members being in slidable relationship to the partition whereby a closure is effected between the passages irrespective of the position of the valve, the ends of the passages and the valve being so positioned in the cylinder head that upon the valve being opened the air and fuel mixture is directed towards the primary combustion chamber and the air towards the secondary combustion chamber, an exhaust valve in the primary combustion chamber, and a spark plug in the primary combustion chamber.

9. An internal combustion engine having a cylinder, a piston reciprocable therein, a cylinder head in which is formed a primary combustion chamber and a secondary combustion chamber, a dividing baffle separating the chambers and extending across the cylinder head, an intake poppet valve positioned in the primary combustion chamber and having its face inclining from the vicinity of the lower face of the baffle to the top face of the primary chamber, an air and fuel passage extending to the valve, an air passage also extending to the valve, said valve constituting an operable closure for both passages, a partition positioned between the passages in the vicinity of the valve, a pair of diametrically positioned wing-like members extending from the valve stem and having their lower edges adjacent the valve head, said wing-like members being in slidable relationship to the partition whereby a closure is effected between the passages irrespective of the position of the valve, the ends of the passages and the valve being so positioned in the cylinder head that upon the valve being opened the air and fuel mixture enters the primary combustion chamber and the air is directed towards the secondary combustion chamber, an exhaust valve in the primary combustion chamber, a spark plug in the primary combustion chamber, and a valve mechanism contained in said passages to synchronously control a flow of air through one passage and a flow of fuel and air through the other passage.

THOMAS EDGAR BROWN.